United States Patent
Barré

(10) Patent No.: US 8,985,269 B2
(45) Date of Patent: Mar. 24, 2015

(54) DEVICE FOR REDUCING THE NOISE EMITTED BY A CONDUIT AND AIRCRAFT CONDUIT EQUIPPED WITH SUCH A DEVICE

(71) Applicant: Dassault Aviation, Paris (FR)

(72) Inventor: Sébastien Barré, Conflans-Sainte-Honorine (FR)

(73) Assignee: Dassault Aviation, Paris (FR)

( * ) Notice: Subject to any disclaimer, the term of this patent is extended or adjusted under 35 U.S.C. 154(b) by 0 days.

(21) Appl. No.: 14/148,520

(22) Filed: Jan. 6, 2014

(65) Prior Publication Data
US 2014/0190765 A1    Jul. 10, 2014

(30) Foreign Application Priority Data
Jan. 7, 2013 (FR) ...................................... 13 00017

(51) Int. Cl.
*F16L 55/033* (2006.01)
*B64C 1/40* (2006.01)
*F04B 39/00* (2006.01)
*F04B 49/06* (2006.01)
*F16L 55/027* (2006.01)

(52) U.S. Cl.
CPC ............... *B64C 1/40* (2013.01); *F04B 39/0055* (2013.01); *F04B 49/06* (2013.01); *F16L 55/02763* (2013.01); *F16L 55/0336* (2013.01)
USPC .......................................... 181/213; 181/258

(58) Field of Classification Search
USPC .......... 181/224, 225, 252, 256, 258; 244/1 N; 454/76
See application file for complete search history.

(56) References Cited

U.S. PATENT DOCUMENTS

| 8,020,663 | B2 * | 9/2011 | Sengissen et al. ............ 181/224 |
| 2009/0269219 | A1 | 10/2009 | Langbein et al. | |
| 2012/0267476 | A1 * | 10/2012 | Thomas ........................ 244/1 N |
| 2013/0025963 | A1 * | 1/2013 | West ............................. 181/256 |

FOREIGN PATENT DOCUMENTS

| DE | 949428 | 9/1956 |
| DE | 2930162 | 2/1981 |

OTHER PUBLICATIONS

Search Report dated Jul. 29, 2013 for France Application No. 13 00017.
Written Opinion dated Jan. 7, 2013 for France Application No. 13 00017.

* cited by examiner

Primary Examiner — Jeremy Luks
(74) Attorney, Agent, or Firm — Davidson, Davidson & Kappel, LLC

(57) ABSTRACT

The invention relates to a device for reducing the noise emitted by a conduit belonging to an aircraft system that comprises an acoustic grid positioned in a segment of the conduit. Said grid has a length L1, along the axis (X-X) of said segment, and includes multiple meshes, each of which fits into a square with side m, the following relationships being satisfied: $L1 > 1.8 \lambda_{fmin}$, $m < \lambda_{fmax}/2$, where $f_{max}$ is the maximum frequency of the noise to be attenuated, $f_{min}$ is the minimum frequency of the nice to be attenuated, $\lambda_{fmax}$ is the wavelength of the noise at frequency $f_{max}$, and $\lambda_{fmin}$ is the wavelength of the noise at frequency $f_{min}$. Application to air intake and outlet conduits of aircraft systems.

10 Claims, 1 Drawing Sheet

DEVICE FOR REDUCING THE NOISE EMITTED BY A CONDUIT AND AIRCRAFT CONDUIT EQUIPPED WITH SUCH A DEVICE

CROSS-REFERENCE TO RELATED APPLICATIONS

This application claims benefit of French patent application serial number FR13 00017, filed Jan. 7, 2013, which is herein incorporated by reference.

BACKGROUND OF THE INVENTION

1. Field of the Invention

The present invention relates to a device for reducing the noise emitted by a conduit, in particular a conduit belonging to an aircraft system (air conditioning, starter-generator, auxiliary power unit).

When an airplane is in the replenishing phase (airplane on the ground and engines off), various pieces of equipment may still be running, in particular:

the air-conditioning system, which makes it possible to regulate the cabin temperature;

the starter-generator, which generates the electricity necessary for the operation of the airplane equipment—in particular air conditioning—when the engines are off;

the APU (Auxiliary Power Unit), which actuates the starter-generator.

These pieces of equipment generate noise around the airplane. This noise exits through the air intake and outlet conduits of those pieces of equipment. It is responsible for noise annoyance affecting the ground personnel (maintenance operations, etc.) and clients moving around the airplane.

2. Description of the Related Art

To reduce these annoyances, the International Civil Aviation Organization (ICAO) has defined recommendations specifying outside noise thresholds that may not be exceeded around the airplane on the ground. Additionally, pressure from airport authorities is increasing to reduce ground noise.

The techniques typically used to reduce the noise of the equipment in question are based on the use of layers of acoustically absorbing materials, positioned on the wall of the conduits or on additional partitions provided inside those conduits.

These existing technologies have several drawbacks:

a) attenuations that are sometimes insufficient: their effectiveness is directly related to the amount of absorbing material used. To significantly reduce noise, it is necessary to cover a very large portion of the walls of the conduits. This often proves problematic, since certain areas of the conduits cannot be treated due to:

the local geometry of the conduit (bends, connections between the parts of the conduit, corners, etc.);

a lack of space around the conduit to integrate a sufficient thickness of material therein.

The conduits for the equipment are also very short. The conduit surface area that may be covered is thus sometimes too limited for effective noise reduction.

(b) bulk constraints: the absorbing materials have thicknesses of several centimeters, which are added to the diameter of the conduits. Their integration involves constraints regarding the positioning of adjacent elements (fasteners, structural elements, other conduits, etc.) so as to free the necessary space.

(c) mass constraints: the large thicknesses and surface areas necessary for the absorbing materials involve significant mass penalties, which penalize the airplane. This is even more accentuated when the treated partitions are added into the conduit.

(d) thermal constraints: the flow passing through certain conduits is heated, which involves choosing absorbing materials that are compatible with high temperatures. These materials often prove heavier and less acoustically effective, which makes these technologies difficult to apply and lower performing in heated conduits.

SUMMARY OF THE INVENTION

The invention aims to provide a noise reduction device that is effective even without acoustically absorbing material.

To that end, the invention relates to a device for reducing the noise emitted by a conduit belonging to an aircraft system, characterized in that it comprises an acoustic grid positioned in a segment T1 of the conduit, said grid having a length L1, along the axis of said segment, and including multiple meshes, each of which fits into a square with side m, the following relationships being satisfied:

$$L1 > 1.8 \lambda_{fmin}$$

$$m < \lambda_{fmax}/2,$$

where $f_{max}$ is the maximum frequency of the noise to be attenuated, $f_{min}$ is the minimum frequency of the noise to be attenuated, $\lambda_{fmax}$ is the wavelength of the noise at frequency $f_{max}$, and $\lambda_{fmin}$ is the wavelength of the noise at frequency $f_{min}$.

According to other features of the device according to the invention:

the grid includes a central opening whose transverse dimension is, in any transverse direction of the conduit, smaller than 0.75 D, where D designates the opening dimension of the conduit in the same transverse direction;

seen from the end, the grid has a square mesh;

seen from the end, the grid has meshes made up of radial partitions relative to the axis of said segment T1 and walls substantially parallel to the inner wall of said segment T1;

the device further comprises, upstream from the grid relative to the propagation of the noise, an acoustic damping layer arranged around at least part of the periphery of the upstream segment of the conduit, said upstream segment being permeable to the sound waves;

the damping layer is adjacent to the upstream end of the grid;

the upstream segment is made up of a metal or composite web;

the acoustic damping layer has a length L2 and a thickness e verifying the following relationships:

$$L2 > \lambda_{fmax}, \text{ and}$$

$$e > \lambda_{fmax}/4.$$

The invention also relates to an aircraft conduit belonging in particular to a system of the aircraft, characterized in that it is equipped with a device as defined above.

This conduit may in particular emerge on an opening of the fuselage of the aircraft, the grid being configured, at its output, in a grid with an esthetic and/or aerodynamic function substantially positioned in that opening of the fuselage.

BRIEF DESCRIPTION OF THE DRAWINGS

Example embodiments of the invention will now be described in light of the appended drawing, in which.

DETAILED DESCRIPTION

Figure 1:
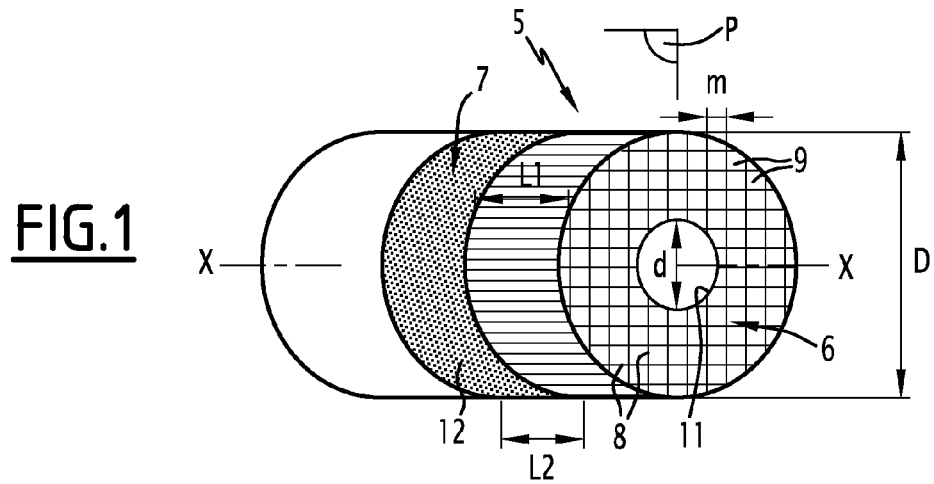
FIG. 1 diagrammatically shows a perspective view of part of a conduit according to the invention.
Figure 2:
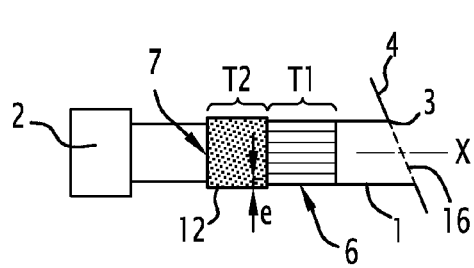
FIG. 2 diagrammatically shows, in longitudinal cross-section, the installation of the conduit of FIG. 1.

FIG. 1 diagrammatically shows a part of a conduit 1 that is typically an air intake or outlet conduit of a system of an aircraft, for example an air conditioning system. As shown in FIG. 2, the conduit 1 connects upstream to a noisy piece of equipment 2 such as those indicated above, and downstream to an opening 3 of the fuselage 4 of the aircraft.

The terms "upstream" and "downstream" are understood relative to the propagation of the noise emitted by the piece of equipment 2.

The conduit 1 has a circular section. The part shown in FIG. 1 is rectilinear, with an axis X-X assumed to be horizontal. For greater clarity, its transverse downstream section has been brought into the plane of the drawing in FIG. 1.

Hereinafter, the following notations are used:

$f_{max}$: maximum frequency of the noise to be attenuated
$\lambda_{fmax}$: wavelength of the noise at frequency $f_{max}$
$f_{min}$: minimum frequency of the noise to the attenuated
$\lambda_{fmin}$: wavelength of the noise at frequency $f_{min}$
D: diameter of the conduit The conduit 1 is equipped, in the first segment T1 of the conduit 1 situated in an intermediate part of the conduit or, alternatively, at its downstream end, with a noise reducing device 5 made up an acoustic grid 6 and a layer 7 of acoustically absorbing material.

The grid 6 is made up of a set of partitions 8 that extend in two directions perpendicular to each other, for example perpendicular and parallel to the vertical diametric plane P of the conduit. The partitions 8 define, in end view (FIG. 1), a plurality of square meshes 9, with side m.

The length of the grid 6, along the axis X-X, is denoted L1. The following relationships are verified:

$$m < \lambda_{fmax}/2; \quad (1)$$

$$L1 > 1.8\ \lambda_{fmin}. \quad (2)$$

It has been observed that when these relationships (1) and (2) are simultaneously verified, the grid 6 in itself imparts a substantial attenuation of the noise for the frequencies comprised between $f_{min}$ and $f_{max}$. In fact, in this frequency range, the grid 6 creates a cut that blocks the propagation of the noise through the grid. Only a small portion of the noise manages to cross the grid, most of the acoustic energy being returned toward the source.

In the example of FIG. 1, the grid includes a central opening 10 optionally embodied by an inner tube 11 with axis X-X. The diameter d of the opening 10 is such that d<0.75 D, where D designates the inner diameter of the conduit 1.

In the case of a conduit with a noncircular section (rectangular or other section), the limit of the central opening from the center of the conduit must be smaller than 75% of the distance between the center and the wall of the conduit, in any direction starting from the center.

The central opening 10 provides the following advantage.

It has been noted that it is the peripheral part of the grid that primarily contributes to the attenuation capacity of the noise by that grid. Subsequently, the opening 10 makes it possible to decrease the mass as well as the pressure drops without significantly damaging the acoustic performance of the grid.

In the example of FIG. 1, the conduit 1 is further equipped, on a second segment T2 situated immediately upstream from the segment T1 and adjacent thereto, with the aforementioned acoustically absorbing layer 7. The latter is made up of least one annular strip 12 of acoustically absorbing material, such as rock wool or glass wool. The length L2 and the thickness e of the strip are such that:

$$L2 > \lambda_{fmax}, \text{ and} \quad (3)$$

$$e > \lambda_{fmax}/4. \quad (4)$$

The segment T2 is made up of perforated sheet metal or perforated composite material, or a metal or composite web so as to allow the acoustic wave to reach the absorbing material, and the strip 12 is positioned around that segment T2.

The role of the strip 12 is to prevent an acoustic resonance effect between the noise source 2 and the grid 6. Its role is in particular to absorb the sound waves reflected by the grid 6 toward the noise source.

Alternatively, the layer may only extend over a fraction of the perimeter of the segment T2, at the cost of lower effectiveness.

Alternatively, the conduit 1 has no annular strip made from acoustically absorbing material, the grid 6 sufficing to obtain the desired acoustic attenuation Alternatively (FIG. 3), mesh shapes other than a square shape may be used as long as the smallest square in which each mesh is fitted has a side m satisfying relationship (1) above.

Figure 3:
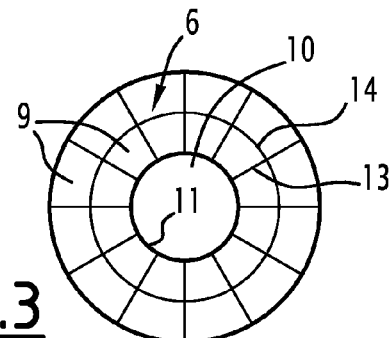
FIG. 3 is an end view showing another embodiment of the acoustic grid according to the invention.
Figures 4, 5:
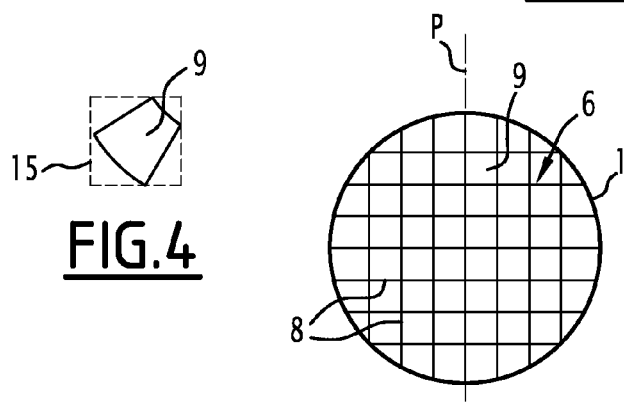
FIG. 4 shows a detail of the grid of FIG. 3.
FIG. 5 is an end view showing an alternative of the acoustic grid of FIG. 1.

In particular, as shown in FIG. 3, the grid may be made up of radial partitions 13 and cylindrical partitions 14, giving rise to trapezoidal meshes 9 with two rounded sides. FIG. 4 shows such a mesh, as well as the smallest square 15 in which it is fitted.

Alternatively (FIG. 5), the grid 6 of FIG. 1 may be provided without a central opening.

Figure 6:
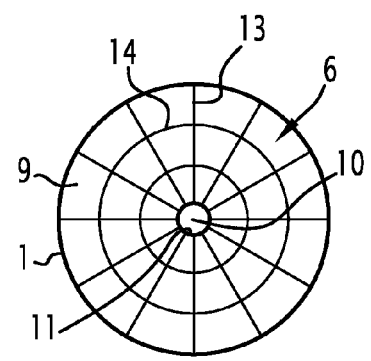
FIG. 6 is an end view showing an alternative of the acoustic grid of FIG. 3.

Also alternatively (FIG. 6), the grid of FIG. 3 may be practically without any central opening, the radially inner edges of the radial partitions 13 being very close to each other, and optionally connected to a central tube 11 with a small diameter just necessary to maintain the geometry of the grid.

In the embodiments described thus far, as shown in FIG. 2, the grid 6 is situated in an intermediate segment T1 of the conduit 1, i.e., it is downstream and is spaced away from the opening 3 of the fuselage. As diagrammatically shown in FIG. 2, this opening is often equipped with a grid 16 that has no acoustic purpose, but plays an esthetic and/or aerodynamic role.

Figure 7:
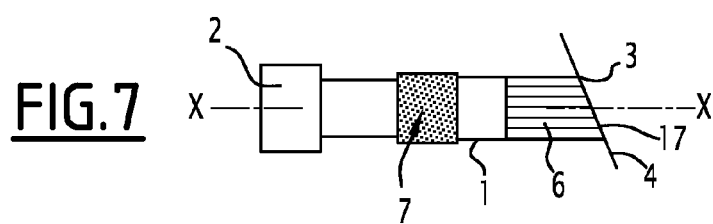
FIG. 7 shows, similarly to FIG. 2, an alternative conduit according to the invention.

Alternatively, as shown in FIG. 7, the downstream end 17 of the acoustic grid 6 may in turn form the esthetic and/or aerodynamic grid situated substantially in the opening 3, such that the grid 16 of FIG. 2 may be omitted.

FIG. 7 also shows another alternative, i.e., positioning of the acoustically absorbing layer 7 at a certain distance upstream from the grid 6.

The device described above has several advantages relative to the earlier technologies:

localized implantation: it is integrated into a localized area of the conduit, which makes it easier to install, without affecting its acoustic effectiveness.

flexibility of placement: its effectiveness does not depend on its position along the conduit. There is therefore no acoustic constraint regarding the choice of its location, which is thus made more flexible.

synergy possible with other technologies: the device may be used jointly with other existing technologies, which makes it possible to combine the effectiveness levels and offset their insufficiencies.

global constraints: the device is integrated inside the conduit and not outside, which reduces its bulk with respect to elements adjacent to the conduit.

fewer thermal constraints: its effectiveness results from its geometry and not the choice of its material. It is therefore more easily adaptable to high temperatures without deteriorating its acoustic performance.

possibility of being substituted for existing elements.

As indicated above, the grid 6 may replace a conventional esthetic and/or aerodynamic grid. It then adds its noise reduction action to the other functions of the conventional grid 16.

The invention claimed is:

1. A device for reducing the noise emitted by a conduit belonging to an aircraft system, comprising:
    an acoustic grid positioned in a segment T1 of the conduit, said grid having a length L1, along the axis of said segment, and including multiple meshes, each of which fits into a square with side m, the following relationships being satisfied:

$L1 > 1.8 \lambda_{fmin}$ $m < \lambda_{fmax}/2,$ where
    $f_{max}$ is the maximum frequency of the noise to be attenuated,
    $f_{min}$ is the minimum frequency of the noise to be attenuated,
    $\lambda_{fmax}$ is the wavelength of the noise at frequency $f_{max}$, and
    $\lambda_{fmin}$ is the wavelength of the noise at frequency $f_{min}$.

2. The device according to claim 1, wherein the grid includes a central opening whereof the transverse dimension is, in any transverse direction of the conduit, smaller than 0.75 D, where D designates the opening dimension of the conduit in the same transverse direction.

3. The device according to claim 1, wherein, seen from the end, the grid has a square mesh.

4. The device according to claim 1, wherein, seen from the end, the grid has meshes made up of radial partitions relative to the axis of said segment T1 and walls substantially parallel to the inner wall of said segment T1.

5. The device according to claim 1, further comprising, upstream from the grid relative to the propagation of the noise, an acoustic damping layer arranged around at least part of the periphery of the upstream segment of the conduit.

6. The device according to claim 5, wherein the damping layer is adjacent to the upstream end of the grid.

7. The device according to claim 5, wherein the upstream segment is made up of a metal or composite web.

8. The device according to claim 5, wherein the acoustic damping layer has a length L2 and a thickness e verifying the following relationships:

$L2 > \lambda_{fmax}$, and $e > \lambda_{fmax}/4.$

9. An aircraft conduit belonging in particular to a system of the aircraft, equipped with a device according to claim 1.

10. The aircraft conduit according to claim 9, emerging on an opening of the fuselage of the aircraft, the grid being configured, at its output, in a grid with an esthetic and/or aerodynamic function substantially positioned in that opening of the fuselage.

* * * * *